US008819428B2

(12) United States Patent  (10) Patent No.: US 8,819,428 B2
Baig  (45) Date of Patent: Aug. 26, 2014

(54) POINT OF SALE (POS) PERSONAL IDENTIFICATION NUMBER (PIN) SECURITY

(71) Applicant: Attaullah Baig, San Jose, CA (US)

(72) Inventor: Attaullah Baig, San Jose, CA (US)

(73) Assignee: EBAY Inc., San Jose, CA (US)

( * ) Notice: Subject to any disclaimer, the term of this patent is extended or adjusted under 35 U.S.C. 154(b) by 8 days.

(21) Appl. No.: 13/649,841

(22) Filed: Oct. 11, 2012

(65) Prior Publication Data

US 2013/0103948 A1  Apr. 25, 2013

Related U.S. Application Data

(60) Provisional application No. 61/550,250, filed on Oct. 21, 2011.

(51) Int. Cl.
*H04L 29/06* (2006.01)
*H04L 9/32* (2006.01)

(52) U.S. Cl.
CPC ............ *H04L 9/3226* (2013.01); *H04L 63/083* (2013.01)
USPC ........................................ 713/168; 713/183

(58) Field of Classification Search
CPC ..... H04L 63/045; H04L 9/088; H04L 9/3226; H04L 63/083
USPC ................................................. 713/168, 183
See application file for complete search history.

(56) References Cited

U.S. PATENT DOCUMENTS

| 6,880,080 | B1 * | 4/2005 | Penders ......................... 713/156 |
| 7,039,809 | B1 * | 5/2006 | Wankmueller ................. 713/182 |
| 2005/0055318 | A1 | 3/2005 | Ziegler |
| 2008/0164976 | A1 | 7/2008 | Griffiths-Harvey et al. |
| 2009/0300364 | A1 * | 12/2009 | Schneider ..................... 713/178 |
| 2009/0307495 | A1 * | 12/2009 | Matsuo ......................... 713/171 |
| 2010/0318468 | A1 | 12/2010 | Carr et al. |
| 2011/0010770 | A1 | 1/2011 | Smith et al. |

OTHER PUBLICATIONS

Focardi, Riccardo, Flaminia L. Luccio, and Graham Steel. "Blunting differential attacks on PIN processing APIs." Identity and Privacy in the Internet Age. Springer Berlin Heidelberg, 2009. 88-103.*

* cited by examiner

*Primary Examiner* — Kambiz Zand
*Assistant Examiner* — Michael Guirguis
(74) *Attorney, Agent, or Firm* — Haynes and Boone, LLP

(57) ABSTRACT

A key is securely injected into a POS PIN pad processor in its usual operating environment. In response to entry of a personal identification number (PIN) into a PIN pad, the processor puts the PIN into a PIN block; puts additional random data into the PIN block; and encrypts the entire PIN block using asymmetric cryptography with a public key derived from the injected key residing in the PIN pad processor. The corresponding private key may be held securely and secretly by an acquirer processor for decrypting the PIN block to retrieve the PIN. The encrypted random data defends the PIN against dictionary attacks. Time stamp data and constant data encrypted with the PIN block enables a defense of the PIN against replay attacks and tampering. The method may also include accepting the PIN from a mobile phone in communication with the processor.

20 Claims, 5 Drawing Sheets

POINT OF SALE (POS) PERSONAL IDENTIFICATION NUMBER (PIN) SECURITY

CROSS REFERENCE TO RELATED APPLICATIONS

This application claims the benefit of priority from U.S. Provisional Patent Application No. 61/550,250, filed Oct. 21, 2011, which is incorporated by reference.

BACKGROUND

1. Technical Field

Embodiments of the present invention generally relate to point of sale (POS) transactions using a mobile device and, more particularly, to providing security for sensitive data received by and transmitted from a POS terminal device.

2. Related Art

With more transactions being contemplated at a point of sale (POS) device—e.g., a key terminal that allows "swiping" of a credit or debit card and entry of a personal identification number (PIN)—using mobile devices, there is a need to secure sensitive data sent from the POS device, which is fixed to a checkout lane in a store, to an acquirer or acquirer processor. An acquirer, for example, may be a part of a bank that receives and pays out funds as opposed to the part of the bank that issues credit, e.g., a credit card issuer. Processing of transactions may be performed by the acquirer, or the acquirer may employ a company that provides electronic commerce and payment processing solutions such as merchant transaction processing services; credit card data processing services for member banks; credit, debit, private-label, gift, payroll and other prepaid card offerings; electronic check acceptance services; Internet commerce and mobile payment solutions; or PIN-secured debit acceptance at ATM and retail locations. Whether performed by the bank itself or a service company, such a processor of transactions may be referred to as an "acquirer processor".

At a POS, security for data (e.g., a consumer-entered PIN) sent from a POS device is generally provided with symmetric cryptography using a key management scheme, typically, a key management technique known as derived unique key per transaction (DUKPT). With DIJKPT, a an initial PIN encryption key (IPEK) is injected into the POS terminal device (e.g., PIN pad or keypad device for PIN entry) in a secure room, for example, by a manufacturer of the POS device. The IPEK initializes a process by which a unique key for each transaction (PIN entry) is derived, and using the derived unique key per transaction, the PIN is encrypted with symmetric cryptography, e.g., Triple Data Encryption Standard (3DES or TDES). The acquirer or acquirer processor, which receives the encrypted PIN and transaction information, may use a master key to help decrypt the PIN.

In cases where it was desired to expand capabilities at the POS terminal for accommodating additional acquirers or acquirer processors, one solution required all PIN pads to be brought back from the merchants to a secure room and a key injected into them. In some instances, such a solution was either prohibitively expensive or otherwise infeasible, and the acquirer opted to provide additional PIN pads for each merchant so that each POS had two PIN pads, even though such a solution may have been similarly expensive as well as potentially confusing to consumers.

Figure 1:
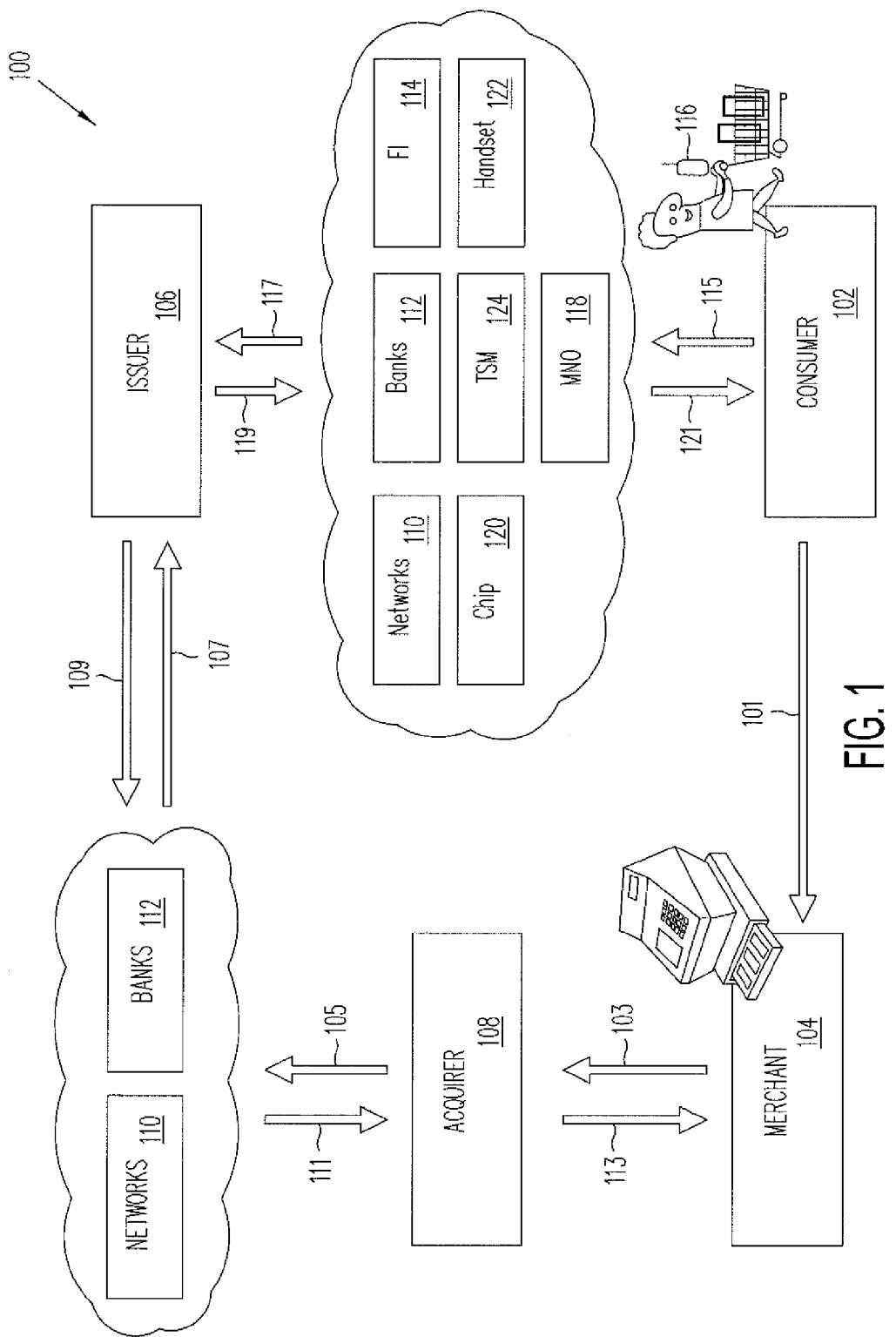
FIG. 1 is a system diagram illustrating an ecosystem for financial transactions using, for example, a credit, debit, or gift card, or a mobile phone function in accordance with one or more embodiments of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for providing security for data, e.g., a consumer's PIN, entered at a POS on a keypad device for PIN entry (also referred to as a PIN pad or PIN entry device). In some embodiments the PIN entry device may be able to communicate with a consumer mobile device (e.g., mobile phone or smart phone) allowing PIN entry from the consumer mobile device. One or more embodiments allow for remotely injecting a key into a PIN pad in its usual operating environment, e.g., at a merchant POS, without the need for transporting the PIN pad to a secure room for injecting the key. In one or more embodiments, for example, the key may be injected using asymmetric or public key cryptography, so that the key may be injected remotely, e.g., over a communication network, to each POS PIN pad so that PIN pads currently in use do not need to be removed from their operating environments to a secure location (and then redelivered to the merchants after the key injection operation), and can be subsequently used without hardware or software changes. Remote key injection may employ cryptographic transmission (for example, asymmetric cryptography such as RSA (Rivest Shamir Adleman) public key cryptography, can be used) of the key and the key may be digitally signed to prevent the use of untrusted keys. The injected key itself may be, for example, a public key of a public-private key pair used in asymmetric cryptography, with the injected, public key residing in the PIN pad or PIN entry device and the corresponding private key residing with the acquirer processor, for example, on a secure server or hardware security module (HSM). Once the PIN is entered on the PIN pad, it may be immediately encrypted into a PIN block that includes data additional to the PIN that may either defend or enable defenses of the encrypted PIN against various types of attacks.

Acquirer processor and related services may be included in services provided by a financial service provider (FSP). Financial service provider services may also include, for example, an online payment service operating between consumers and merchants and may also be a service provided by a financial service provider (FSP)—such as PayPal, Inc. of San Jose, Calif.—in which a user of the service may have an account with the FSP (referred to as an "FSP account).

In one or more embodiments, methods, systems, and computer program products provide an economical solution—one not requiring POS terminal transport or additional POS terminals—for expanding capabilities at a POS terminal for accommodating additional acquirers or acquirer processors. For example, a computer-implemented method may include: securely injecting a public key into a POS PIN pad processor in its usual operating environment. Once the key is received and authenticated by the processor, e.g., by checking a digital signature of the key, the method may continue with: putting—by the processor, in response to entry of a personal identification number (PIN) into a PIN entry device—the PIN into a PIN block; putting, by the processor, additional random data into the PIN block; encrypting, by the processor, the entire PIN block including the PIN and the additional random data using asymmetric cryptography, in which: encrypting the PIN block uses a public key in a memory of the processor; decrypting the PIN block to retrieve the PIN uses a private key, not accessible from the processor, corresponding to the public key; and the encrypted additional random data defends the encrypted PIN block against dictionary attacks. The PIN block may further include time stamp data and constant data. The encrypted time stamp data enables a defense of the encrypted PIN block against replay attacks. The encrypted constant data enables a defense of the encrypted PIN block against tampering. The method may also include accepting the PIN from a mobile phone in communication with the processor.

FIG. 1 illustrates an ecosystem 100 for financial transactions using, for example, a credit, debit, or gift card, or a mobile phone function. FIG. 1 shows a variant of the traditional "four-corners model" that is adapted to reflect the specificities of the financial ecosystem 100. FIG. 1 shows information and monetary or credit flows 101, 103, 105, 107, 109, 111 that may take place between various entities (e.g., 102, 104, 108, 106) in support of or in consequence of a financial transaction between a consumer 102 and a merchant 104 in the case that an issuer 106 (e.g., credit card company or bank) and an acquirer 108 (e.g., a bank or a part of a bank that receives and pays out funds as opposed to the part that issues credit, the issuer) are involved. As shown in FIG. 1, flows 103 and 113 between merchant 104 and acquirer 108 may involve direct communications between merchant 104 and acquirer 108. Flows 105 and 111 may involve additional communications and transactions flowing through networks 110 and banks 112 (acquirer 108 may be one of banks 112). Similarly, as seen in FIG. 1, flows 115, 117, 119, 121 between consumer 102 and issuer 106 may involve communications and transactions flowing through networks 110, banks 112, and financial institutions (FI) 114. When additional functionality for using a mobile handset 116 to facilitate a transaction is provided in accordance with one or more embodiments of the present invention, flows 115, 117, 119, 121 between consumer 102 and issuer 106 may involve communications and transactions that involve additional entities. Examples of such additional entities, as seen in FIG. 1, include mobile network operators (MNO) 118, manufacturers of integrated circuit chips (Chip) 120, manufacturers and providers of mobile handsets (Handset) 122, and trusted service managers (TSM) 124 as defined by the GSMA (Global System for Mobile Association).

Figure 2:
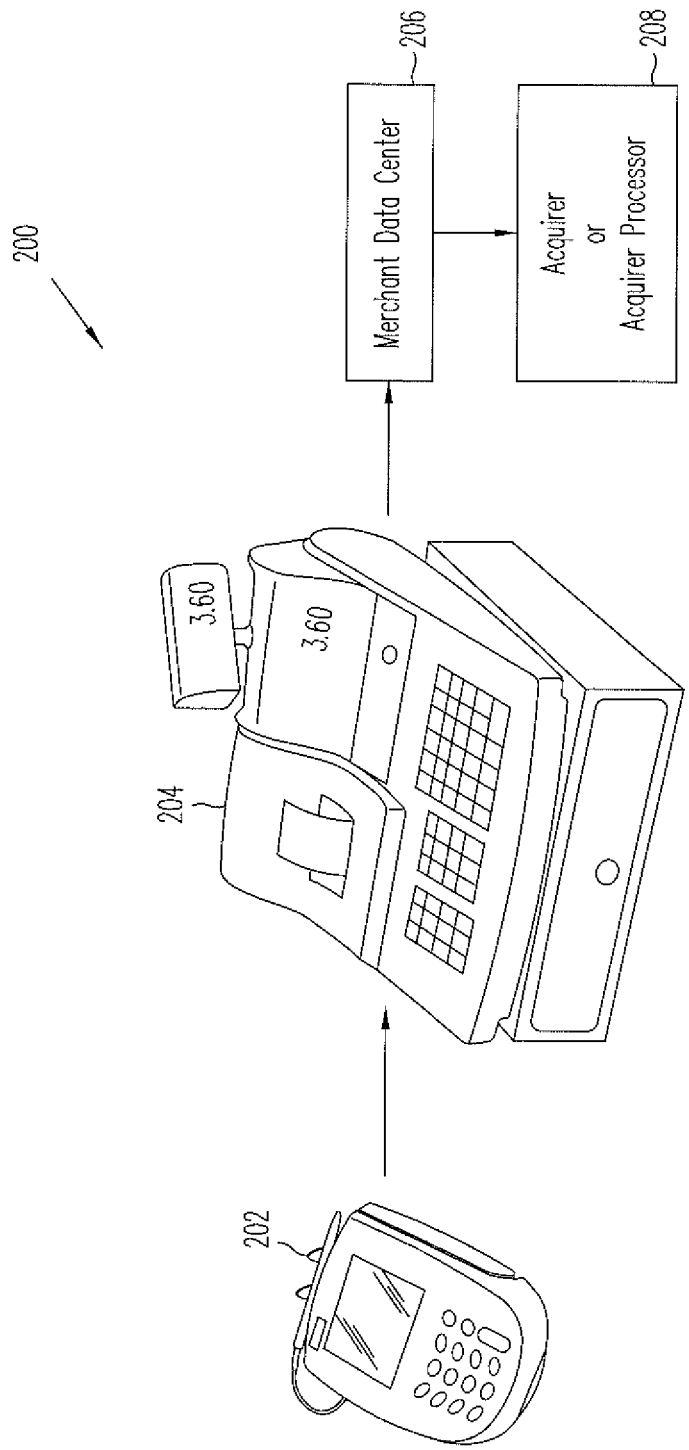
FIG. 2 is a system block diagram illustrating a system 200, which may be a portion of the system 100 shown in FIG. 1, in accordance with one or more embodiments.

FIG. 2 illustrates a system 200 in accordance with one or more embodiments; system 200 may be a portion of the system 100 shown in FIG. 1. As seen in FIG. 2, system 200 may include a PIN entry device 202 (also referred to as "PIN pad") in communication with a merchant POS terminal 204 so that the POS terminal 204 may accept PIN entry along with credit or debit card or other transaction information from PIN pad 202, which may include a computer processor for performing the needed operations and electronic communications. POS terminal 204 or PIN pad 202 may also be configured to accept PIN and other transaction information from a consumer mobile device, for example. For brevity, the examples assume that PIN pad 202 accepts and encrypts PIN and other information that is sent to merchant data center 206 from POS terminal 204 even though methods and systems, according to some embodiments, for protecting PIN privacy may be applicable, for example, to consumer mobile devices in communication with a POS terminal 204. Merchant data center 206 may comprise, for example, computer processors, servers, and databases operated by a merchant (e.g., merchant 104, shown in FIG. 1) for receiving transaction data, accounting, and performing transactions with acquirer or acquirer processor 208 for facilitating business between customers and the merchant operating the point of sale. Acquire processor 208, may be an acquirer processor, for example, of acquirer 108 shown in FIG. 1.

In one embodiment, a service provider or other entity, including acquirer 208, for example, may wish to provide PIN security for communications between PIN pad 202, already in operation at merchant 104, and acquirer 208 without having to relocate what may be a large number of PIN pads 202 to secure location for key injection, followed by returning the same PIN pads 202 to their usual operating environment, or providing multiple PIN pads 202 at each location with the new PIN pads having the injected key (e.g., a DUKPT IPEK). In one or more embodiments, a public key (of a public-private key pair) of an asymmetric cryptography system (e.g., an RSA public key cryptography system) may be injected into each POS PIN pad 202 in its usual operating environment, without transporting the PIN pads. For example, each PIN pad 202 may be "field flashed" (a technique for updating programmable read only memory (PROM) known in the art) with a software update that may not require other changes to hardware or software. The public key (for encrypting transmissions to the acquirer processor 208) of the public-private key pair may then reside in the PIN pad 202, and the private key (for decrypting the transmissions that have reached acquirer processor 208) may reside at acquirer processor 208, for example, in a secure server of acquirer processor 208 or a hardware security module (HSM) of acquirer processor 208. In addition, the injected public key may be injected by a manufacturer in the case, for example, of a new PIN pad 202.

One possible type of attack on system 200 is to inject an untrusted (e.g., a false or fraudulent) key into the PIN pad 202, which could allow all encrypted PINs to be decrypted by an untrusted party. To prevent an untrusted (e.g., a false or fraudulent) public key from being injected into a PIN pad 202, the injected public key may be digitally signed by a trusted authority, e.g., the acquirer or acquirer processor 208, or the FSP. A public key to verify the signature may be embedded in the application that runs on the PIN pad 202 for encrypting PINs and processing or communicating transaction data to POS terminal 204. Also, any application that runs on the PIN pad 202 may be digitally signed by the PIN pad manufacturer. Thus, a combination of digital signatures and verification techniques may be used to ensure that only a valid, trusted public key for PIN block encryption is injected into the PIN pad 202.

Attempting to use public-private key or asymmetric cryptography in a straightforward manner for PIN encryption from a PIN pad such as PIN pad 202 may present a number of technical issues. For example, a typical PIN pad may have a limited amount of memory available for use for encryption and limited processing power (e.g., slower clock frequency) relative to the expense—in terms of memory, processor speed, and space for secure socket layer (SSL) libraries— needed for asymmetric cryptography relative to what is needed for DUKPT key management and 3DES symmetric cryptography typically used.

In one or more embodiments, therefore, the asymmetric cryptography to be used with the injected public key may be adapted for use with a PIN pad such as PIN pad 202 by using a smaller key size than would be used if security comparable to that of AES (Advanced Encryption Standard) were to be required. In order to compensate, the application that accepts PIN entry from a user into PIN pad 202 may put the PIN in a PIN block along with various other items and forms of data that can provide additional forms of security supplemental to that of the a public key encryption adapted for use with PIN pad 202. The PIN and the additional data may be encrypted with the injected, trusted public key as soon as the PIN is entered on PIN pad 202 by, for example, a consumer user, e.g., consumer 102 shown in FIG. 1, who may also use mobile device 116, shown in FIG. 1, for communication of PIN entry and other transaction information.

Figure 3:
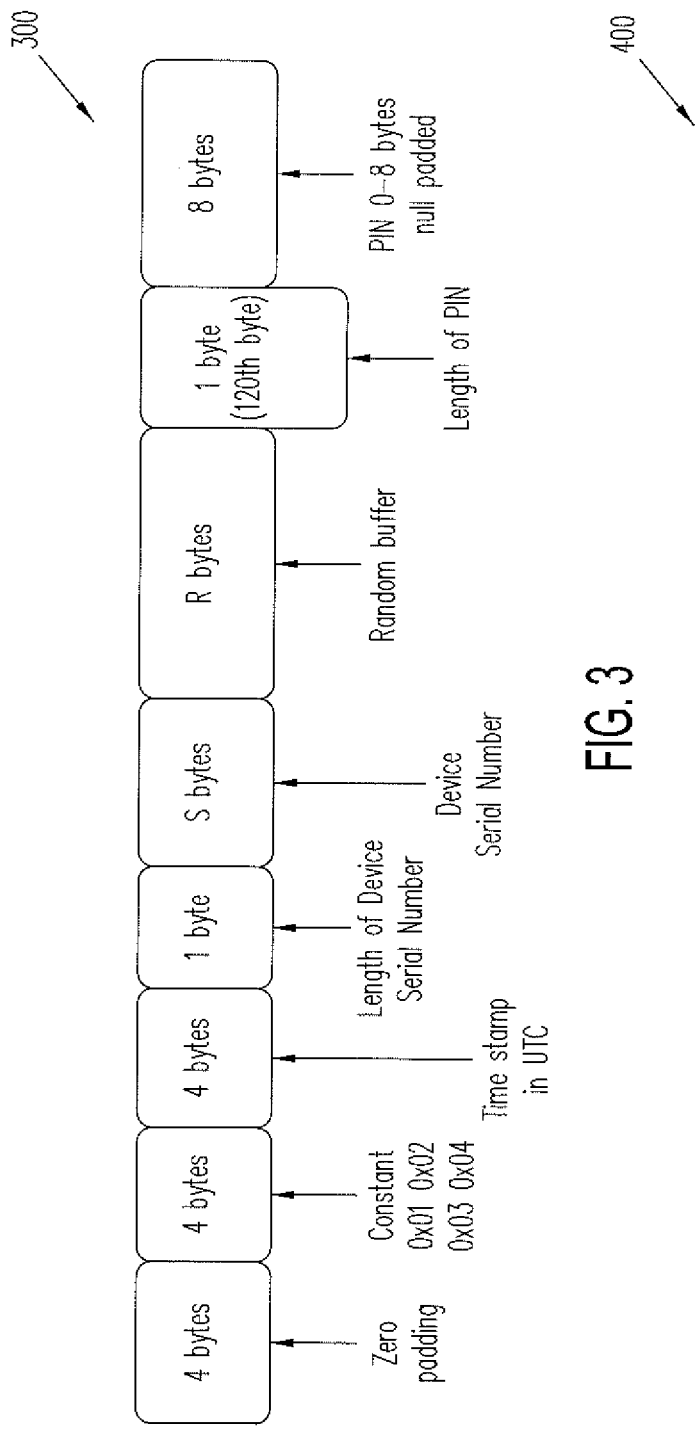
FIG. 3 is a data diagram illustrating construction of a PIN block in accordance with an embodiment.

FIG. 3 illustrates one of many possible examples of construction of a PIN block 300 in accordance with an embodiment. PIN block 300 may include, as shown in FIG. 3, a zero padding data field (e.g., data whose value is set to zero); a data field containing constant data (e.g., data whose value is constant so that the same value is put in each PIN block regardless of the PIN value entered, for example, or the time the PIN is entered); a time stamp or time stamp data; a device identification (ID) (e.g., a device serial number preceded by information, e.g., length, for recovery of the device serial number); random data (e.g., a bit sequence generated by a pseudo-random number generator and varying from each PIN block to the next); and the PIN itself which may be preceded (or accompanied) by information, e.g., length of PIN, to aid recovery of the PIN.

The particular example illustrated in FIG. 3 shows a length in bytes (8 bits of data) for each of the data fields listed above. The length of the data fields are chosen in FIG. 3 so that the total length of the PIN block is 128 bytes (1024 bits). Thus, for example, once the length S of the device ID (which may vary from one PIN pad manufacture to another) is known, the length R of the random data buffer may be chosen so that the total length of the PIN block comes out to 128 bytes.

PIN block 300 may include, as shown, four bytes of zero padding, which may be included for technical reasons related to the particular public key algorithm used (e.g., RSA) to ensure that there is a straightforward implementation of the algorithm that will provide a uniquely decipherable encryption of the entire PIN block each time and that the encrypted PIN block may fit in the same space as the original PIN block, e.g., 128 bytes for the example shown in FIG. 3.

PIN block 300 may include a constant data field. The constant data may have the same value for each PIN block sent from PIN pad 202, for example, a specific value is illustrated in FIG. 3 consisting of a numerical value of 1 in the first byte (written as 0x01 in hexadecimal notation), 2 in the second byte, and so on. Because the same constant value should be encountered in those particular four bytes each time a PIN block is decrypted, a decryption that reveals other than the correct constant value (e.g., the sequence 1, 2, 3, 4 in this example) will indicate that the encrypted payload 400 (see FIG. 4) may have been tampered with and that the encrypted PIN should be rejected. Thus, the constant data field of PIN block 300 may reveal tampering if the decrypted value does not match the encrypted value so that the constant data field of PIN block 300 may enable a defense of the transmitted encrypted PIN against tampering.

PIN block 300 may include a time stamp or time stamp data. For example, a numerical value corresponding to Coordinated Universal Time (UTC) at the time the PIN block is constructed may be put in the PIN block by PIN pad 202. PIN pad 202 may, for example, put a Unix operating system time stamp in the four bytes of PIN block 300 indicated in FIG. 3. "Replay attack" refers to an attempt to replay an encrypted payload (e.g., payload 400 shown in FIG. 4) containing the encrypted PIN by a malicious party who, for example, may have captured the encrypted payload 400 in transmission from PIN pad 202 to POS terminal 204, merchant data center 206, or acquirer processor 208. The timestamp or a combination of the time stamp and device serial number (as further described below) may enable a defense against replay attack because the time stamp data (and other combined data) decrypted from the replayed payload 400 will be inconsistent with what it should be at the time the replayed payload data is received. Further detail is given below with reference to FIG. 6. In addition, in the case of a user using a mobile device 116—such as a mobile phone—the user's mobile phone number can also be employed in combination with the time stamp data to prevent replay attacks.

PIN block 300 may include a device ID such as a device serial number, which may include, for example, a manufacturer ID plus device ID in the form of coded information that can be linked be linked to the specific device and manufacturer of the device, such as numbers that can be looked up in a table of device IDs. The device (e.g., PIN pad 202) serial number may vary in form from device to device so that the length, S, in bytes of the device serial number may vary. Thus, the device ID may be accompanied—in the example of FIG. 3, immediately preceded by—information pertaining to the length S, e.g., the number S itself, of bytes used to represent the device ID. The device ID may be used in combination with other data in the PIN block to help prevent replay attacks, for example.

PIN block 300 may include random data such as a bit sequence generated by a pseudo-random number generator that varies with each encrypting of a new PIN block. The random data encrypted with the PIN may defend the encrypted PIN block against dictionary attacks. For example, in the case of a four-digit PIN, the basic idea of a dictionary attack is that there are only 10,000 possibilities for a four digit PIN so the attacker could encrypt each of the 10,000 possibilities to form a dictionary of encrypted PINS. Then when the attacker sees an encrypted PIN, the attacker can simply match the encrypted PIN to an entry in the dictionary to find out what the original PIN is. The varying, random data vastly increases the number of possibilities for what may be encrypted in payload 400, thereby defending the encrypted payload, its PIN and other information in the payload from dictionary attacks. The length, R, in bytes, of the random buffer containing the random data may be chosen to complement the length S of the device serial number so that the entire PIN block comes out to some desired length, e.g., 128 bytes in the example illustrated in FIG. 3.

PIN block 300 may include a PIN entered by the user using PIN pad 202 or a consumer mobile device 116, which may, for example, communicate with PIN pad 202 or POS terminal 204. The PIN may be accompanied somewhere in the PIN block (e.g., immediately preceded by in the example of FIG. 3) by the length of the PIN to aid recovery of the PIN. For example, if the length is indicated as 4, the acquirer processor

208, upon decrypting the PIN block 300 may then know to find, according to a pre-defined scheme, 4 bytes of PIN data followed by 4 bytes of null padding.

Figure 4:
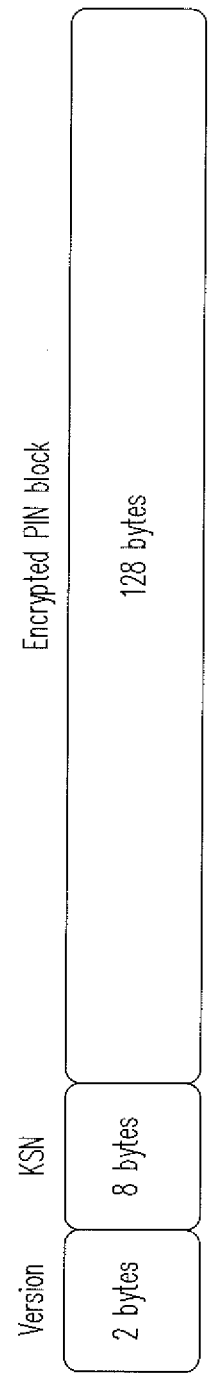
FIG. 4 is a data diagram illustrating an encrypted PIN block in accordance with an embodiment.

FIG. 4 illustrates an encrypted payload 400 in accordance with an embodiment. Encrypted payload 400 may be transmitted from PIN pad 200 to POS terminal 204 and on to acquirer or acquirer processor 208. Encrypted payload 400 may include version data, a key serial number, and a 128-byte encryption of PIN block 300. Version data may, for example, include 2 bytes of information that may be used for indicating algorithm type, such as RSA, which may help the acquirer processor 208 determine, for example, that it is not receiving a DUKPT encrypted communication, thus helping to ensure compatibility between different types of systems. The key serial number (KSN) data may help the acquirer processor 208 determine, for example, the correct private key that will correspond to the public key used to encrypt payload 400 and that can be used to decrypt the encrypted version of PIN block 300, included in payload 400, and which may occupy the same number of bytes, e.g., 128 bytes in this example, in payload 400 as the original PIN block 300.

Figure 5:
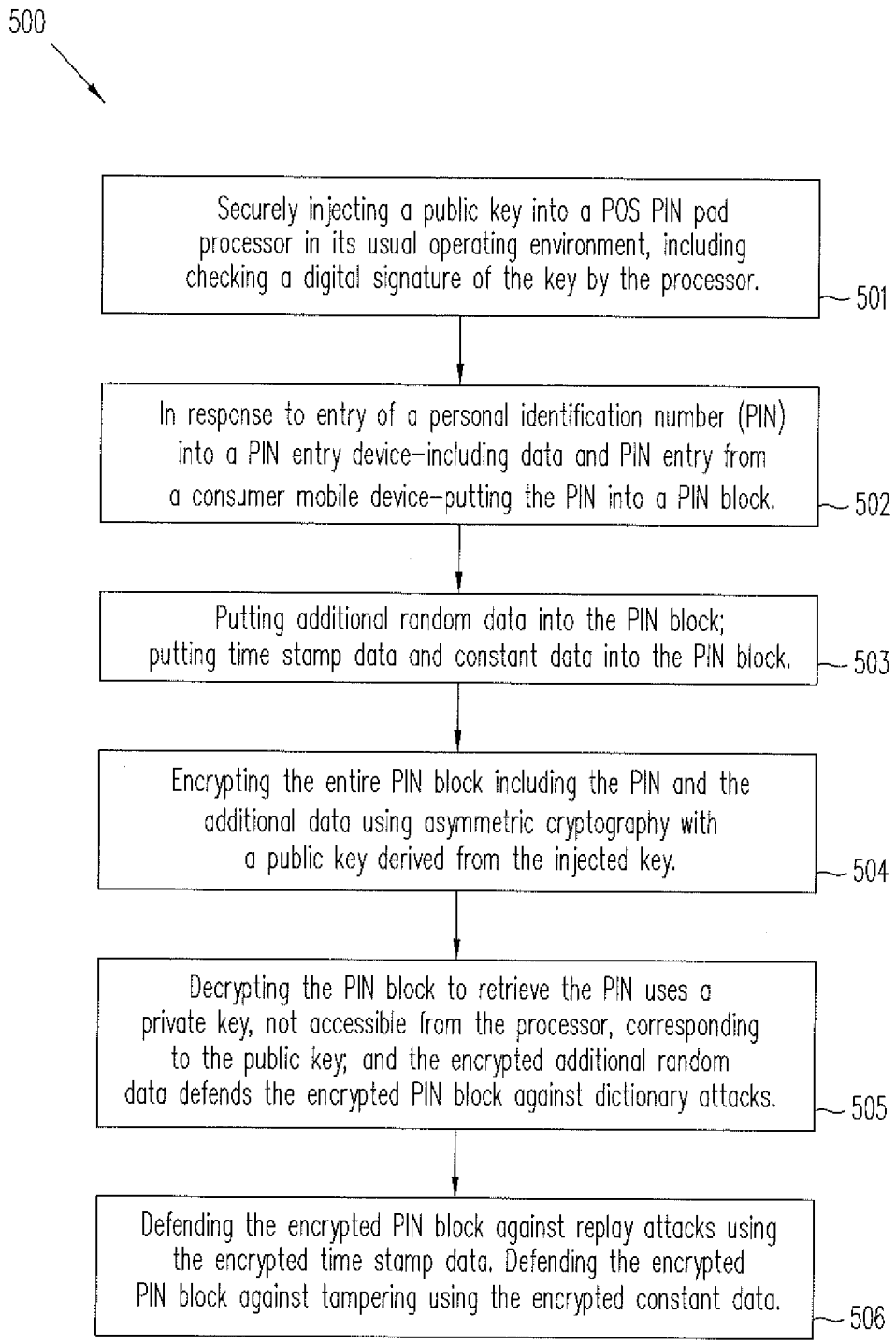
FIG. 5 is a flow chart illustrating a method for PIN security in accordance with an embodiment.

FIG. 5 illustrates an example of a method 500 for PIN security, in accordance with an embodiment.

At step 501, a new or existing PIN pad (e.g., PIN pad 202) may be initialized for performing method 500 by securely injecting a public key into a processor of the PIN pad, either at the manufacturer, for example, or in the PIN pad's usual operating environment, in the case of an existing PIN pad already in use, for example, at a POS of a merchant. Injecting the key may include checking a digital signature of the key by the processor to prevent the use of, for example, spurious keys being injected into the PIN pad.

At step 502, in response to entry of a personal identification number (PIN) into a PIN entry device—including data and PIN entry from a consumer mobile device—e.g., PIN pad 202, the processor of PIN pad 202 may immediately put the PIN into a PIN block, e.g., PIN block 300.

At step 503, the processor of PIN pad 202 may put additional random data into the PIN block, and may put time stamp data and constant data into the PIN block, e.g., PIN block 300 as shown in FIG. 3.

At step 504, the processor of PIN pad 202 may encrypt the entire PIN block including the PIN and the additional data (e.g., zero padding, constant, time stamp, length of device serial number, device serial number, random data, length of PIN, and PIN) using asymmetric cryptography using the public key injected at step 501. The injected public key of step 501 may itself be protected, e.g., using digital signature and encryption, so that the public key used may, more generally, be said to be derived from the injected key at step 501. The encrypted PIN block may be included in a payload, e.g., payload 400, along with additional information such as a version number or code and a key serial number or code and transmitted to a receiving party, e.g., acquirer or acquirer processor 208.

At step 505, the receiving party, e.g., acquirer processor 208, may decrypt the payload 400 containing the PIN block 300 to retrieve the PIN 300 using a private key corresponding to the public key. The additional information such as version number and key serial number may aid the receiving party in finding the correct private key to match the public key. The private key may not be accessible from the PIN pad processor, or any intermediate or intervening parties, and the encrypted additional random data may defend the encrypted PIN block against dictionary attacks as previously described.

At step 506, method 500 may include defending the encrypted PIN block in payload 400 against replay attacks using the encrypted time stamp data as describe above and further described below with reference to FIG. 6. Method 500 also may include defending the encrypted PIN block against tampering using the encrypted constant data by checking the whether the decrypted constant data matches the known constant of PIN block 300 before encryption. Lack of a match indicates possible tampering and the payload 400 may be rejected as invalid, for example.

Figure 6:
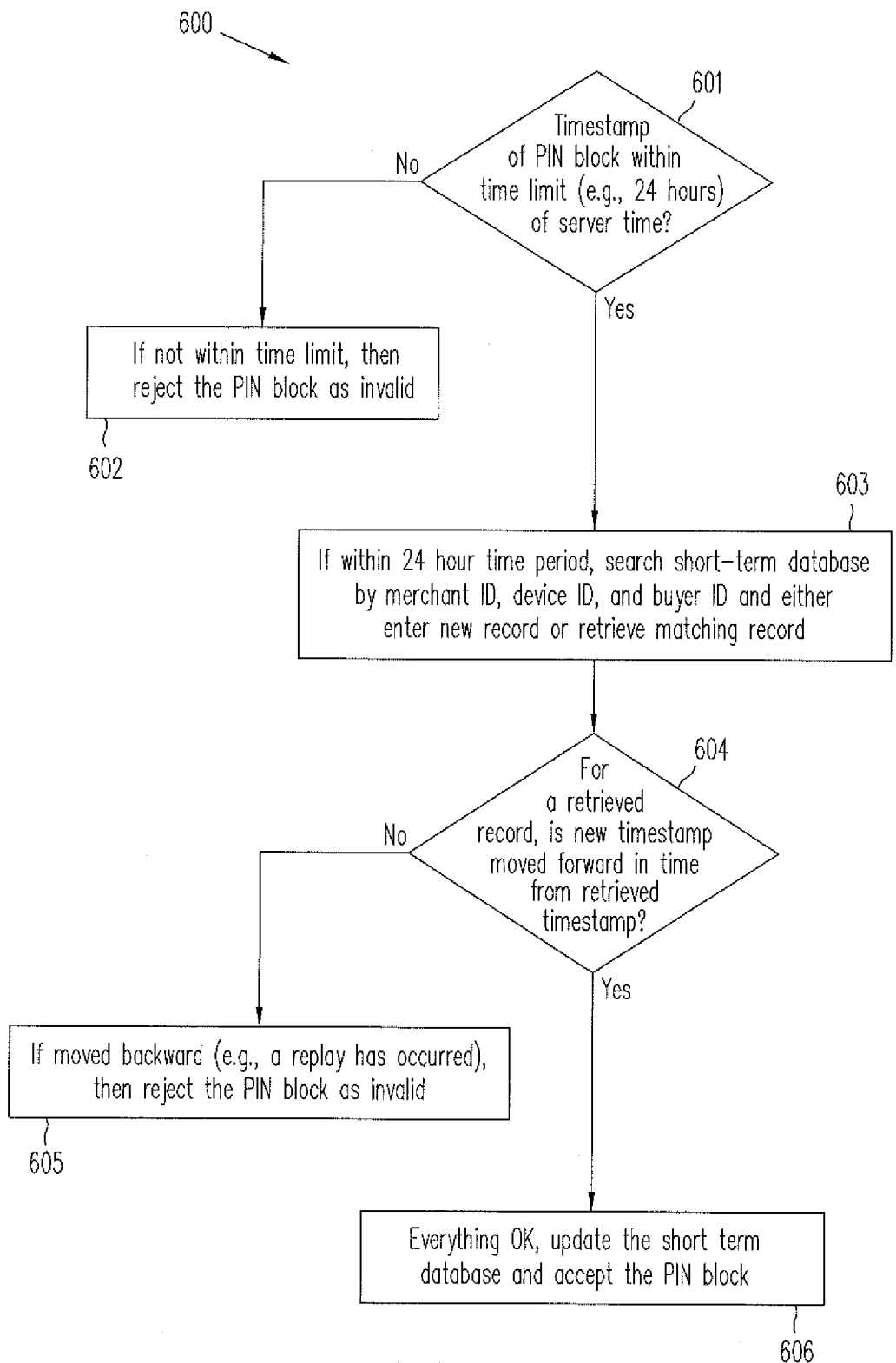
FIG. 6 is a flow chart illustrating a method for defending against replay attacks in accordance with an embodiment.

FIG. 6 illustrates a method 600 for defending against replay attacks on a payload containing an encrypted PIN block, in accordance with an embodiment.

At step 601, a processor executing method 600 (e.g., acquirer processor 208) may check whether a time stamp of PIN block (e.g., PIN block 300 decrypted from payload 400) is within a pre-defined time limit (such as 24 hours) of the current time, e.g., time returned by a call to a server, referred to as server time.

At step 602, if the time stamp of the PIN block is not within the pre-defined time limit, then the processor (e.g., acquirer processor 208) may reject the PIN block as invalid.

At step 603, if the time stamp of the PIN block is within the pre-defined time limit (e.g., the 24 hour time period), the processor of method 600 may search a short-term database using merchant ID, device ID, and buyer ID information that it has from the merchant as well as from the PIN block payload. The search, for example, may form a key from the information and then quickly search for a matching key in the short-term database. Depending on whether or not a match is found for the PIN block, merchant, and buyer, the processor of method 600 may either enter new record (reflecting the present transaction and PIN entry) in the short-term database or retrieve the matching record.

At step 604, if a matching record has been retrieved, the processor of method 600 may check whether the new timestamp (timestamp from the present PIN block reflecting the present transaction and PIN entry) has moved forward in time from the timestamp of the retrieved matching record.

At step 605, if the new timestamp (reflecting the present transaction and PIN entry) is less than or the same as the timestamp of the retrieved matching record, the present transaction appears to have moved backward in time, which may indicate that an attempt at replaying the encrypted payload (e.g., payload 400) has occurred, so that the processor of method 600 may then reject the PIN block as invalid.

At step 606, if the new timestamp (reflecting the present transaction and PIN entry) is greater than the timestamp of the retrieved matching record, the present transaction appears to have moved forward in time, which may indicate that all is well, e.g., no attempt at replaying the encrypted payload (e.g., payload 400) has occurred, so that the processor of method 600 may then update the short-term database with the new record and accept the PIN block as valid, for example, for completing the transaction with the merchant (e.g., merchant 104) at POS terminal 204.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

FIG. 1 illustrates an exemplary embodiment of a network-based system 100 for implementing one or more processes described herein. As shown, network-based system 100 may comprise or implement a plurality of servers or software components, or both, that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It can be appreciated that the servers illustrated in FIG. 1 may be deployed in other ways and that the operations performed or the services provided by such servers may be combined or separated for a given implementation and may be performed by a greater number or fewer number of servers. One or more servers may be operated or maintained by the same or different entities.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PSTN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms is or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   a processor configured to communicate with a merchant data center; and
   a data storage device including a computer-readable medium having computer readable code for instructing the processor, and when executed by the processor, the processor performs operations comprising:
   putting a personal identification number (PIN) into a PIN block;
   generating additional random data;
   putting the additional random data into the PIN block;
   encrypting the entire PIN block including the PIN and the additional random data using asymmetric cryptography, wherein:
     encrypting the PIN block uses a public key stored in the data storage device;
     decrypting the PIN block to retrieve the PIN uses a private key corresponding to the public key, wherein the private key is not accessible from the processor or the data storage device; and the encrypted additional random data defends the encrypted PIN block against dictionary attacks.

2. The system of claim 1, wherein the operations further comprise:
receiving the public key by the computer processor in a usual operating environment without transport of the computer processor.

3. The system of claim 1, wherein the operations further comprise:
putting a time stamp into the PIN block;
encrypting the entire PIN block including the PIN, the additional random data, and the time stamp, wherein:
the encrypted time stamp enables a defense of the encrypted PIN block against replay attacks.

4. The system of claim 1, wherein the operations further comprise:
putting a constant data into the PIN block;
encrypting the entire PIN block including the PIN, the additional random data, and the constant data, wherein:
the encrypted constant data enables a defense of the encrypted PIN block against tampering.

5. The system of claim 1, wherein the operations further comprise:
receiving the public key by the computer processor, wherein the public key is cryptographically signed by an authorized issuer of the public key; and
checking, by the computer processor, that the public key is signed by the authorized issuer of the public key before encrypting the PIN block.

6. A computer processor implemented method comprising:
putting, by the processor, a personal identification number (PIN) into a PIN block;
generating additional random data;
putting, by the processor, the additional random data into the PIN block;
encrypting, by the processor, the entire PIN block including the PIN and the additional random data using asymmetric cryptography, wherein:
encrypting the PIN block uses a public key in a memory of the processor;
decrypting the PIN block to retrieve the PIN uses a private key, not accessible from the processor, corresponding to the public key; and
the encrypted additional random data defends the encrypted PIN block against dictionary attacks.

7. The method of claim 6, further comprising:
receiving the public key by the computer processor in a usual operating environment.

8. The method of claim 6, further comprising:
putting, by the processor, time stamp data into the PIN block;
encrypting, by the processor, the entire PIN block including the PIN, the additional random data, and the time stamp data, wherein:
the encrypted time stamp data enables a defense of the encrypted PIN block against replay attacks.

9. The method of claim 6, further comprising:
putting, by the processor, a constant data into the PIN block;
encrypting, by the processor, the entire PIN block including the PIN, the additional random data and the constant data, wherein:
the encrypted constant data enables a defense of the encrypted PIN block against tampering.

10. The method of claim 6, further comprising:
receiving the public key by the computer processor, wherein the public key is cryptographically signed by an authorized issuer of the public key; and
checking, by the computer processor, that the public key is signed by the authorized issuer of the public key before encrypting the PIN block.

11. The method of claim 6, wherein
the private key corresponding to the public key is held by the acquirer processor; and
the private key is used to decrypt the PIN block and retrieve the PIN by the acquirer processor.

12. The method of claim 6, farther comprising:
transmitting the encrypted PIN block with additional information to an acquirer processor, wherein:
the additional information enables the acquirer processor to identify from a plurality of private keys the correct private key corresponding to the public key used to encrypt the PIN block.

13. The method of claim 6, further comprising:
accepting the PIN from a mobile phone in communication with the processor.

14. A computer program product comprising a non-transitory computer readable medium having computer readable and executable code for instructing a processor to perform a method, the method comprising:
putting a personal identification number (PIN) into a PIN block;
generating additional random data;
putting the additional random data into the PIN block;
encrypting the entire PIN block including the PIN and the additional random data using asymmetric cryptography, wherein:
encrypting the PIN block uses a public key stored in a memory of the processor;
decrypting the PIN block to retrieve the PIN uses a private key, not accessible from the processor, corresponding to the public key; and
the encrypted additional random data defends the encrypted PIN block against dictionary attacks.

15. The computer program product of claim 14, wherein the method further comprises:
receiving the public key by the computer processor in the computer processor's usual operating environment.

16. The computer program product of claim 14, wherein the method further comprises:
putting time stamp data into the PIN block;
encrypting the entire PIN block including the PIN, the additional random data, and the time stamp data, wherein:
the encrypted time stamp data enables a defense of the encrypted PIN block against replay attacks.

17. The computer program product of claim 14, wherein the method further comprises:
putting a constant data into the PIN block;
encrypting the entire PIN block including the PIN, the additional random data, and the constant data, wherein:
the encrypted constant data enables a defense of the encrypted PIN block against tampering.

18. The computer program product of claim 14, wherein the method further comprises:
receiving the public key by the computer processor, wherein the public key is cryptographically signed by an authorized issuer of the public key; and
checking that the public key is signed by the authorized issuer of the public key before encrypting the PIN block.

19. The computer program product of claim 14, wherein the method further comprises:
   transmitting the encrypted PIN block with additional information to an acquirer processor, wherein:
   the additional information enables the acquirer processor to identify from a plurality of private keys the correct private key corresponding to the public key used to encrypt the PIN block.

20. The computer program product of claim 14, wherein the method further comprises:
   accepting the PIN from a mobile phone in communication with the processor.

* * * * *